United States Patent [19]

Markham et al.

[11] 4,455,234

[45] Jun. 19, 1984

[54] PROCESS OF EXTRACTING A METAL VALUE

[75] Inventors: David Markham, Maidenhead; Clifford G. Brown, Leatherhead; John M. Simon, Chessington, all of England

[73] Assignee: Michigan State University, East Lansing, Mich.

[21] Appl. No.: 427,786

[22] Filed: Sep. 29, 1982

[30] Foreign Application Priority Data

Sep. 29, 1981 [GB] United Kingdom ............... 8129427
Sep. 29, 1981 [GB] United Kingdom ............... 8129428

[51] Int. Cl.$^3$ ............................................. C02F 3/08
[52] U.S. Cl. .................................. 210/638; 210/639; 210/711; 210/712; 210/805
[58] Field of Search ............... 210/634, 638, 639, 660, 210/663, 665, 667, 669, 702, 708, 710, 711, 712, 713, 805; 423/112, 132, 139, 150, 157

[56] References Cited

U.S. PATENT DOCUMENTS

| 3,800,024 | 3/1974 | Forsell | 210/710 X |
| 4,314,974 | 2/1982 | Libby | 210/634 X |
| 4,334,999 | 6/1982 | Cornwell | 210/638 |

*Primary Examiner*—Benoit Castel
*Assistant Examiner*—W. Gary Jones
*Attorney, Agent, or Firm*—Lee, Smith & Zickert

[57] ABSTRACT

To extract a metal value, particularly aluminium, from an aqueous feed stream containing the value to be extracted is treated in a recovery unit from which it passes to a contactor where it is contacted with a solvent stream including a partially water soluble extractant for the value and an organic diluent. The delivery from the contactor is separated into an organic phase, an aqueous raffinate and a dispersed intermediate phase. The organic phase is stripped of the value and recycled to the solvent stream. The raffinate as recycled by being added to the feed stream, and the intermediate phase is treated for recovery of extractant.

17 Claims, 1 Drawing Figure

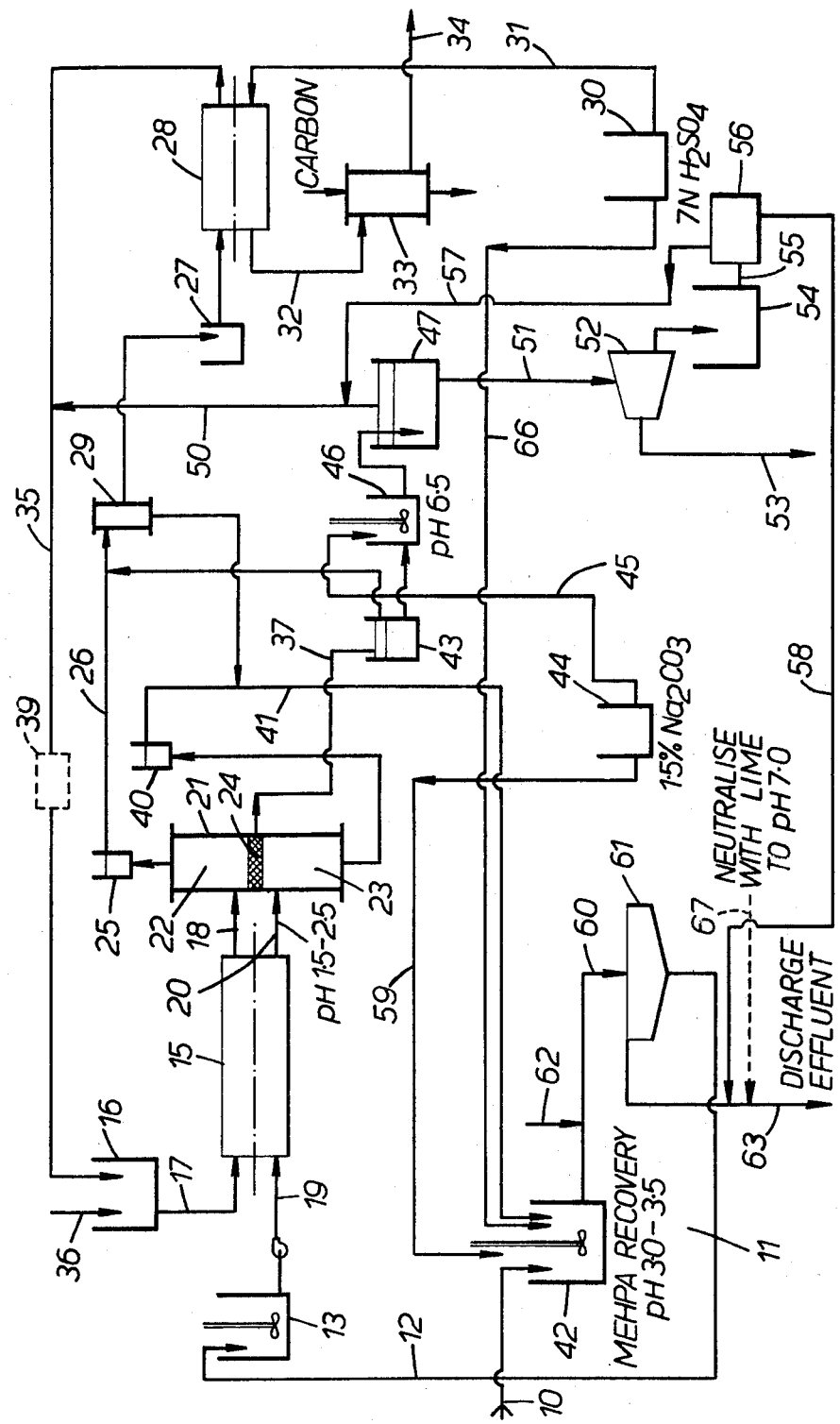

PROCESS OF EXTRACTING A METAL VALUE

This invention relates to the extraction of a desired value from an aqueous feed stream and is primarily, but not exclusively, concerned with the extraction of an aluminium value from an aqueous slurry containing a substantially water-insoluble compound or compounds of aluminium.

In the treatment of water using alum to coagulate turbidity-creating material and other impurities, a hydrated floc is formed consisting of the impurities and insoluble hydroxides of aluminium. It is necessary to treat that floc before disposal and it is desirable that the aluminium values should be recovered for reuse.

It has previously been proposed in Cornwell U.S. Pat. No. 4,334,999 to extract metal values in general, and aluminium values in particular, from a hydrated floc containing the hydroxides of the metal in insoluble form, by contacting the slurry containing the floc with an organic solvent consisting of an extractant for the metal, dissolved in an organic diluent, so that the metal values are extracted as a compound of the extractant. The preferred extractant proposed has been di-(2-ethylhexyl) phosphoric acid (referred to as hereinafter as DEHPA) or a mixture of DEHPA with mono-(2-ethylhexyl) phosphoric acid ("MEHPA"). While the proposed extraction has operated satisfactorily for relatively low solids concentrations in the floc and for relatively long contact times, in practice it has proved difficult to operate the process under conditions experienced in the field, where the solids concentration is higher and long contact times are impractical. In particular, the process, instead of producing readily separable organic and aqueous phases, from which the solvent and the metal value can be simply recovered, has given a voluminous third dispersed phase requiring complicated and expensive separation stages if loss of extractant and metal is to be avoided, and if the raffinate is to be environmentally acceptable for disposal.

Where an extractant which is partially water-soluble is used, there is a danger of extractant being lost to the system in the raffinate. MEHPA is partially water-soluble and, if an extractant consisting of a mixture of MEHPA and DEHPA is employed, as is preferred in the present invention, a part of the MEHPA finds its way into the raffinate, and unless preventive measures are taken, is lost. Substantial loss of extractant not only increases the operating costs of the process, but is also environmentally undesirable.

In the present invention, any water-soluble extractant in the raffinate is recovered by recycling to the incoming feed all or part of the raffinate containing the extractant.

Thus, the present invention resides in a continuous extraction process in which an aqueous feed-stream containing a value to be extracted is contacted with an extractant for the value which extractant is at least partially water soluble; a complex of the extractant and the value is removed in an organic phase; and the aqueous raffinate containing any remaining dissolved extractant is recycled.

Preferably, the feed stream slurry includes a floc containing the value to be extracted; the feed stream slurry may thus be flocculated sludge derived from a water treatment plant in which alum is used as a coagulant. The value may then be a metal, particularly aluminium or iron and the extractant is preferably an equimolar mixture of DEHPA and MEHPA.

The invention will be more readily understood by way of example from the following description of a process for recovering alum from a sludge derived from water treatment employing alum as a flocculant. The process is illustrated in the accompanying flow diagram.

The process employs a solvent comprising a diluent, usually kerosene, a modifier such as tributyl phosphate, and an extractant which is an equi-molar mixture of mono-(2-ethylhexyl) phosphoric acid and di-(2ethylhexyl) phosphoric acid (referred to as "MEHPA" and "DEHPA" respectively).

The highly flocculated raw sludge in entered on line 10 and passes through a solvent recovery and dewatering unit 11. The feed stream from recovery unit 11 passes on line 12 to a holding and mixing tank 13 from which it passes on line 19 and enters a continuous contacting device illustrated as a rotary contactor 15 as the aqueous phase. In the contactor, which is preferably as described in U.S. Pat. No. 3,649,209. The sludge is gently contacted with an organic phase constituted by the solvent pumped out of solvent tank 16 on line 17. The two phases pass through contactor 15, advantageously co-currently as shown.

At the discharge end of the contactor 15, the pH of the aqueous phase has fallen to between about 1.5 and 2.5. The organic phase and the aqueous phase are discharged from the contactor on lines 18 and 20 respectively and are entered into a separating tank 21 at different levels, as shown.

In the contactor 15, the extractant captures aluminium values in the aqueous phase and forms aluminium - extractant complexes, the reaction being promoted by the MEHPA, which is more water-soluble than the DEHPA and a part of which enters the aqueous phase. The aluminium-DEPHA complexes are oleophyllic and move into the organic phase, to be removed in that phase on line 18. At the end of the contactor, a large proportion of the aluminium values initially contained in the sludge has been extracted into the organic phase. The contactor organic discharge on line 18 then consists predominantly of solvent; aluminium-DEHPA complexes; and a dispersion containing organic solvent, water, solids, and aluminium DEHPA complexes. The aqueous discharge on line 20 includes a proportion of MEHPA.

In the separating tank 21, the discharge from the contactor 15 separate into three phases, as follows:

1. an upper organic phase 22 consisting of solvent, and extracted aluminium-DEHPA complexes;

2. a lower aqueous phase 23 consisting largely of water but containing MEHPA, and 3. an intermediate third phase 24, which is dispersion of the organic and aqueous phases and which contains virtually all residual solids.

Tank 21 is transparent, so enabling the level of the third phase 24 to be monitored and, where a rotary contactor is used, the interface between the phases in that contactor 15 to be controlled by adjustment of the steady head tanks 25 and 40.

The upper organic phase 22 leaves tank 21 to the steady head tank 25 and passes therefrom on line 26 to a coalescing unit 29 from which the lighter phase passes to a tank 27. From tank 27 the organic phase is pumped into a stripping unit 28, which is shown as a countercurrent continuous contactor of the same general design as contactor 15, but which could alternatively be a mixer settler or series of mixer settlers, or an equivalent contacting device. In stripping unit 28, the organic phase meets a counter-current feed on 7N sulphuric acid supplied from tank 30 on line 31, and the aluminium values are stripped from the solvent and are discharged as alum on line 32. After passing through an activated carbon column 33 to remove colour and other matter, the alum is discharged for further use one line 34. The organic phase discharged from stripping unit 28 consists of recovered solvent which is recycled on line 35 to solvent tank 16 to which is added make-up solvent on line 36 as necessary. If the feed on line 10 contains other constituents such as iron that are extracted by the solvent into the organic phase and are not stripped in unit 28, one or more clean up stages 39 may be included in line 35 to purify the solvent for reuse.

The aqueous phase 23 in tank 21 passes to the steady head tank 40 and after being joined by the heavier phase from unit 29 is led via line 41 to a mixer tank 42 of the solvent recovery unit 11, so that extractant (MEHPA) contained in the aqueous phase is recycled and is not lost to the system.

The third phase 24 is separately removed and is pumped on line 37 to a gravity separator 43, the heavier phase passing to a mixer 46 to which is added 1.5% sodium carbonate derived from tank 44 and fed to mixer 46 on line 45. The lighter phase from separator 43 joins line 26 and is fed to the coalescing unit 29. The amount of dilute sodium carbonate added to the third phase from separator 43 is such as to raise the pH to about 6.5 and thereby break the dispersion. The product from the mixer 46 is passed to a further gravity separator 47, from which the organic phase is led on line 50 to the solvent recycle line 35. The aqueous phase from separator 47 is pumped on line 51 to a centrifuge 52 which discharges the solids on line 53. The aqueous phase from the centrifuge consists of water, MEHPA and DEHPA and is fed via a holding tank 54 and line 55 to a treatment unit 56. In the treatment unit 56, the aqueous phase is treated to separate the MEHPA and DEHPA from the residual water, the former being directed on line 57 to the solvent recycle line 35 and the latter being discharged on line 58.

Mixer 42 of MEHPA recovery unit 11 receives the raw sludge 10 and the aqueous phase containing water-soluble extractant recycled through line 41; the pH of the mixture in mixer 42 is adjusted to between about 3.0 and 4.0 by the addition of sulphuric acid from tank 30 by line 66 or sodium carbonate from tank 44 by line 59. The mixture is withdrawn from mixer 42 on line 60 and is fed to a clarifier 61, flocculant being added if necessary on line 62. The overflow from clarifier 61 and the aqueous phase from treatment unit 56 are discharged on line 63 after neutralisation with lime supplied on line 67. The clarifier slurry underflow, which becomes the aqueous feed stream to the contactor 15, is pumped at a controlled density of about 1% by weight via line 12 to the mixer 13 for treatment in the extraction contactor 15 as described. The MEHPA recovery unit 1 is shown as a single stage but further stages may be added as necessary.

The pH and residence time in mixer 42 are critical, the latter being of the order of 1 hour, and are chosen to minimise MEHPA extractant loss with the discharged overflow from the clarifier. The MEHPA in the raffinate pumped to mixer 42 is then recovered with the clarifier slurry underflow and is recycled.

It has been found advantageous to maintain the solids in the feed to contactor 15 at approximately 1% by volume of the feed and to have the flow rates of the solvent and the feed to the contactor approximately equal. The extractant (DEHPA and MEHPA) should comprise approximately 10% by weight of the solvent (extractant, modifier and diluent).

In one illustrative example, the streams of the flow diagram of the FIGURE have the following make-up, based on a slurry feed to contactor 15 of 100 volume units having a 1% solids content:

| Flow Stream Description | Number | Water Flow | Solvent Diluent Flow (Kero/TBP) | Extractant Flow MEHPA | Extractant Flow DEPHA | Solids Flow (weight/total vol.) |
|---|---|---|---|---|---|---|
| Raw Sludge | 10 | 49.00 | — | — | — | 1.00 |
| Thickened Discharge | 12 | 97.91 | 0.800 | 0.289 | — | 1.00 |
| Discharge Effluent | 63 | 53.80 | 0.050 | 0.005 | — | — |
| Solvent Feed | 17 | — | 91.955 | 3.700 | 4.345 | — |
| Direct Extract | 18 | — | 89.680 | 3.573 | 4.245 | — |
| Dispersion | 37 | 2.450 | 2.275 | 0.125 | 0.100 | 0.05 |
| Raffinate | 41 | 95.46 | 0.800 | 0.291 | — | — |
| 1.5% Na$_2$CO$_3$ solution | 45 | 5.000 | — | — | — | — |
| Centrifuge Feed | 51 | 7.450 | 0.200 | 0.115 | — | 0.05 |
| Recovered Extract | 50 | — | 2.22 | 0.119 | 0.100 | — |
| Centrifuge Aqueous phase | 55 | 7.250 | 0.195 | 0.112 | — | — |
| Centrifuge solids | 53 | 0.200 | 0.005 | 0.003 | — | 0.05 |
| 7N acid feed to strip | 31 | 3.700 | — | — | — | — |
| Act carbon | 74 | — | — | — | — | — |
| Alum Product | 34 | 3.700 | — | — | — | — |
| Solvent make up | 36 | | 0.055 | 0.008 | — | — |
| Contactor | 19 | 97.690 | 0.800 | 0.289 | — | 1.00 |

| Flow Stream Description | Number | Water Flow | Solvent Diluent Flow (Kero/TBP) | Extractant Flow MEHPA | Extractant Flow DEPHA | Solids Flow (weight/total vol.) |
|---|---|---|---|---|---|---|
| sludge feed | | | | | | |

As will be seen from the above table, the loss of extractant, and particularly the DEHPA, from the circuit is negligible, the make-up solvent on line 36 being merely 0.008 MEHPA and zero DEHPA compared with a flow of MEHPA AND DEHPA on line 17 of 3.700 and 4.345 respectively. That is achieved by recycling to the incoming sludge the aqueous phases from the separation tank 21 and the coalescing unit 29 on line 41 and thereby recovering extractant in those phases, and by recycling the solvent recovered in unit 56 by recycle line 35.

The table shows that MEHPA flow delivered to the mixer 42 on the raffinate recycle line 41 is 0.291 whereas MEHPA lost through discharge on the overflow line 63 is only 0.005, representing a loss of less than 2%. This comparison also demonstrates that MEHPA recovery in the recovery unit 11 occurs before discharge of the overflow from the clarifier 61 on line 63. It will be further noted that the large discharge of water on the line 63 permits a commensurately large input flow of raw sludge on line 10 without progressive increase in the total flow through the circuit.

The recycling of the extractant contained in the third phase 24 is made possible only by the effective breaking of the third phase dispersion, since it has been found that the dispersion without prior treatment cannot be effectively separated by centrifuging. The addition of sodium carbonate in mixer 46 to break the dispersion and to effect pH control to advance the transfer of extractant into the organic phase is thus of importance.

The process has the added advantage that the solids are readily removed separately. That is achieved by concentrating the solids in the third phase 24, and by the sodium carbonate dosing and pH control in mixer 46, which enable the solids to be separated in the centrifuge 52 from the organic and aqueous phases.

The process as described above has been found to be selective for aluminium against at least Fe, Ca, Cr, Cu, Zn and Pb. However, by appropriate modification, the process may be made to extract a metal other than aluminium from a floc containing the metal. Of particular importance is the recovery of iron as iron sulphate from a floc derived from a water treatment plant employing iron sulphate in place of alum as the coagulant.

We claim:

1. A continuous extraction process comprising the steps of:
    (a) contacting an aqueous feed stream containing a value to be extracted with an organic solvent containing an extractant for said value, said extractant being at least partially water soluble;
    (b) thereby forming an organic phase and an aqueous phase;
    (c) removing in said organic phase a complex of said extractant and said value;
    (d) recycling at least a part of said aqueous phase containing dissolved extractant,
    (e) forming a mixture of said recycled aqueous phase with an aqueous input stream containing the value to be extracted, whereby said mixture forms said feed stream and includes recycled and recovered dissolved extractant and
    (f) dewatering said mixture before the mixture is contacted with said organic solvent.

2. A continuous extraction process according to claim 1, in which, prior to dewatering, the pH of said mixture is adjusted.

3. A continuous extraction process according to claim 3, in which the pH of said mixture is adjusted to between about 3.0 and about 4.0.

4. A continuous extraction process according to claim 1, in which said mixture is treated with a flocculant and then clarified, the underflow after clarification being contacted with said organic solvent.

5. A continuous extraction process according to claim 1, in which, after being contacted with said solvent, the contacted feed stream is separated into an organic phase, an aqueous raffinate phase, and an intermediate phase which is a dispersion of the organic and aqueous phases; said aqueous phase is recycled to the feed stream; and said intermediate phase is treated to break the dispersion, separated into organic and aqueous components, and the organic component recycled.

6. A continuous extraction process according to claim 5, in which said aqueous component is centrifuged to remove solids.

7. A continuous extraction process according to claim 5, in which said dispersion is broken by pH adjustment.

8. A continuous extraction process according to claim 7, in which the pH of said dispersion is adjusted to about 6.5.

9. A continuous extraction process according to claim 1, in which said extractant is a mixture of DEHPA and MEHPA.

10. A process according to claim 1, in which said input stream is a slurry including a floc containing said value to be extracted.

11. A process according to claim 1, in which said value to be extracted is a metal.

12. A process according to claim 11, in which said metal is aluminium.

13. A continuous extraction process for extracting an aluminium value for a feed stream of an aqueous flocculated slurry containing said value, the process comprising:
    (a) dewatering said feed stream;
    (b) contacting said dewatered feed stream with an organic solvent stream comprising an extractant for said value, said extractant being partially water soluble;
    (c) thereby deriving an organic phase, an aqueous raffinate containing dissolved extractant, and an intermediate phase;
    (d) said intermediate phase being a dispersion of the organic and aqueous phases and containing extractant;
    (e) recycling said raffinate by adding it to said feed stream prior to said dewatering;

(f) treating said intermediate phase for recovery of extractant;

(g) stripping said value from said organic phase and regenerating said solvent; and (h) recycling said regenerated solvent as at least a part of said solvent stream.

14. A continuous extraction process according to claim 13, in which said extractant is an approximately equimolar mixture of DEHPA and MEHPA.

15. A continuous extraction process according to claim 14, in which said solvent stream includes an organic solvent in which said extractant is at least partially soluble.

16. A continuous extraction process according to claim 13, including adjusting the pH of said raffinate to between 3.0 and 4.0.

17. A continuous extraction process according to claim 13, including bringing the solids content of said feed stream to about 1% by volume.

* * * * *